United States Patent
Maier

[11] 3,711,577
[45] Jan. 16, 1973

[54] NITRILO(ETHYLENEPHOSPHONIC ACID ESTERS)

[75] Inventor: Ludwig Maier, Zurich, Switzerland

[73] Assignee: Monsanto Co., St. Louis, Mo.

[22] Filed: Feb. 11, 1970

[21] Appl. No.: 10,604

[52] U.S. Cl.....................260/932, 44/76, 44/DIG. 4, 252/49.9, 252/DIG. 17, 117/136, 260/502.5, 260/979

[51] Int. Cl. ............................C07f 9/40, D06c 27/00

[58] Field of Search......................................260/932

[56] References Cited

UNITED STATES PATENTS 3,242,236   3/1966   Moedritzer......................260/932 X
3,549,728   12/1970  Balde et al...........................260/932

*Primary Examiner*—Lewis Gotts
*Assistant Examiner*—Anton H. Sutton
*Attorney*—James W. Williams, Neal E. Willis and Thomas B. Leslie

[57] ABSTRACT

Compounds of the formula

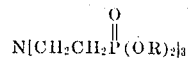

in which R is a hydrocarbon group or hydrogen atom and a process for preparing them by reacting tri(2-chloroethyl)amine with a phosphite of the formula $$MOP(OR)_2 \text{ or } P(OR)_2OR'$$

wherein M is an alkali metal or R' is a hydrocarbon group and preparing the acid by acid hydrolysis or pyrrolysis of the ester. Exemplary compounds are nitrilotri(ethylenephosphonic acid) and nitrilotri(ethylenephosphonic acid diethylester) which are useful as additives to detergents, as lubricants and flameproofing agents.

2 Claims, No Drawings

NITRILO(ETHYLENEPHOSPHONIC ACID ESTERS)

The present invention relates to nitrilotri(ethylenephosphonic acid esters) and nitrilotri(ethylenephosphonic acid) of the general formula

in which R signifies a hydrocarbon group or a hydrogen atom. Preferably, such groups are alkyl and aryl groups having up to eight carbon atoms.

Only the analogous nitrilotri(methylenephosphonic acid esters) and nitrilotri(methylenephosphonic acid) have been known previously. In comparison to the hitherto known compounds, the new compounds herein described possess advantages which will be shown below.

The preparation of the compounds according to the invention is achieved by a. reacting tri(2-chloroethyl)amine of the formula $(ClCH_2CH_2)_3N$ with an alkali phosphite of the general formula $MOP(OR)_2$, where M is Na or K and R has the same significance as above, in a molar ratio of about 1 : 3, possibly in an inert solvent, at about 80° to 200° C, or b. reacting tri(2-chloroethyl)amine with a phosphite of the general formula $P(OR)_2OR'$, in which R has the same significance as above and R' signifies a hydrocarbon group, whose chlorine derivative R'Cl is volatile at the reaction temperature and pressure employed, at about 140° to 200° C and removing continuously the by-product R'Cl formed from the reaction mixture by distillation, and c. thereafter, if desired, converting the nitrilotri(ethylene-phosphonic acid ester) formed to the nitrilotri(ethylenephosphonic acid) by acid hydrolysis or pyrrolysis.

The preparation of the nitrilotri(ethylenephosphonic acid esters) according to the first method occurs according to the equation

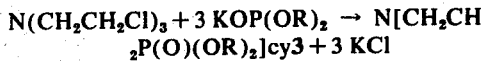

The reaction can be carried out with or without a solvent. The reaction of alkali phosphites with reactive halogen compounds is well known per se and the same working processes can be used. Temperatures of about 80° to 200° C are needed in the present case so that the reaction proceeds at a satisfactory speed. The reaction is slower at lower temperatures.

The preparation of the nitrilotri(ethylenephosphonic acid esters) according to the second method occurs according to the equation

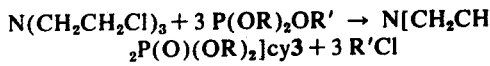

This reaction is expediently carried out without a solvent in an inert atmosphere. Temperatures of about 140° to 200° C are required to effect the reaction fast enough. In some instances still higher temperatures are applicable. The upper temperature is limited by the occurrence of a more extensive decomposition which is recognizable by the formation of other products of splitting than the expected hydrocarbon halide R'Cl.

It is apparent that in the second method two of the three ester groups originally present in the phosphite will be preserved in the end product. The phosphite to be reacted contains at least one aliphatic ester group OR', whose chlorine derivative R'Cl formed by cleavage is volatile at the reaction temperature and pressure employed. R' is preferably an alkyl group having one to four carbon atoms. The two other ester groups OR may be identical with the ester group OR' or optionally be derived from monohydric alcohols or phenols. Contrary to the group R', the kind of the organic group R has no influence on the course of reaction. The starting compound $N(CH_2CH_2Cl)_3$ and the phosphites utilizable herein as well as methods for their preparation are well known from the literature and therefore a recitation of same is not necessary. Illustrative of the alkyl and aryl groups represented by R and R' within their meaning as set forth above are, for example, methyl, ethyl, isopropyl, propyl, butyl, amyl, hexyl, octyl and the like and phenyl, tolyl, ethyl phenyl, xylyl and the like.

The ester groups are subjected to acid hydrolysis for the preparation of the nitrilotri(ethylenephosphinic acid). Concentrated hydrochloric acid is preferably used. In general, the hydrolysis of all ester groups requires several hours. However, the hydrolysis can be promoted by addition of well known catalysts such as $ZnCl_2$ or $TiCl_4$. The group R' is so selected that it will be easily cleavable if the esters are not to be used directly. In general, the more easily available methyl ester, ethyl ester, propyl ester or butyl ester will be used for the hydrolysis, since the alkyl chloride formed is very volatile.

Certain esters may also be thermally decomposed. A particularly advantageous method of preparing nitrilotri(ethylene-phosphonic acid) resides in the thermal decomposition of the corresponding isopropyl ester. Propylene is split off at about 190° C, whereupon the acid quantitatively remains.

The nitrilotri(ethylenephosphonic acid) is a hexabasic acid occurring probably as an "inner" salt, because of the presence of a basic amino group.

To those skilled in the art it is clear that the nitrilotri(ethylenephosphonic acid esters) can also be only partially hydrolyzed. This is expediently achieved by hydrolyzing with an exactly calculated amount of caustic soda solution or caustic potash solution. The corresponding alkali salts of the mixed ester-acids are obtained upon evaporation. The free acids can be prepared in known manner from the salts by treating with an ion exchange resin. Such products then can contain from 1 ester group and 5 hydroxyl groups up to 5 ester groups and 1 hydroxyl group.

The conversion to the corresponding metal salts, ammonium salts or substituted ammonium salts is feasible according to common methods. Under the term "substituted ammonium salts" are understood herein the corresponding salts of primary, secondary or tertiary amines. Included are, for example, ethanolamine, diethanolamine and triethanolamine, as well as their condensation products with ethylene oxide, as used in the manufacture of detergents.

The amine salts may range from soluble to insoluble in water. Salts with distinctly basic amines such as alkylamines, morpholine, piperidine etc. are easily soluble in water. Salts with weakly basic aromatic amines such as aniline, naphthylamine, diphenylamine etc. may be difficultly soluble to insoluble. Alkali salts can be obtained by simple neutralization with corresponding alkali hydroxides. These are easily soluble in water. Alkaline earth metal salts can also be prepared by this way. Because of the strong acid character of the nitrilotri-(ethylenephosphonic acid), also carbonates such as sodium carbonate, calcium carbonate and magnesium carbonate are easily decomposed. Other metal salts such as tin salts, zinc salts, aluminum salts, lead salts and iron salts are obtainable in known manner by double reaction of the alkali salt with a corresponding metal halide.

The nitrilotri(ethylenephosphonic acid esters) have liquid, oily to solid consistency according to the nature of the organic group R. The esters are useful as additives to detergents, dry cleaning agents in organic solvents, additives to gasoline, as fire retardant lubricants and as flame-proofing agents for paper, textile fabrics and the like.

The nitrilotri(ethylenephosphonic acid) in the form of its sodium salt is suitable for use as an additive to alkaline detergents. It possesses complexing ability towards calcium ions, magnesium ions, iron ions, copper ions and many other metal ions. The acid and its salts are superior in high temperature stability as compared to other well known complexing agents which today are used especially in detergents. Numerous detergent compositions have been described which contain complexing agents, such as sodium tripolyphosphate, sodium hexametaphosphate, trisodium nitrilotriacetate, and the like. Such complex forming compounds can totally or partially be replaced by water soluble salts of the nitrilotri(ethylenephosphonic acid).

EXAMPLE

To 41.4 g (0.3 mol) $(C_2H_5O)_2P(O)H$ in 400 ml of ether there are added in portions 11.8 g (0.3 mol) of potassium. The reaction is exothermic and the ether boils. The potassium salt formed $(C_2H_5O)_2POK$, precipitates. After 1 hour boiling, 20.4 g (0.1 mol) of $N(CH_2CH_2Cl)_3$ in 100 ml of ether are added to the suspension at 30° to 35° C. Since no substantial reaction can be observed at this temperature($Cl^-$ detection is negative), the ether is distilled off and 300 ml toluene are added and the mixture is refluxed. After 8 hours the potassium chloride formed is filtered off, the filtrate evaporated and heated in high vacuum at 50° C to remove the easily volatile components. A residue remains. Yield 30 g (59 percent) of $[(C_2H_5O)_2P(O)CH_2CH_2]_3N$, a viscous liquid which does not crystallize at room temperature. The compound is not distillable without decomposition. Its refractive index is $n_D^{20}$ 1.465.

The $^1H$-NMR spectrum confirms the structure as

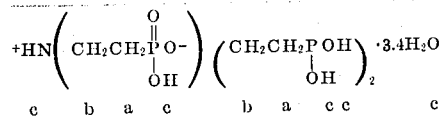

a. $CH_3$ 1.30δ ($J_{HH}$7Hz, 18 H, ber. 18 H);
b. $PCH_2$ 1.6 – 2.3δ (multiplet, 6.0 6 H calc'd 6 H;
c. $NCH_2$ 2.4 – 3.2δ (multiplet), 7.9 H, calc'd 6 H; and
d. $OCH_2$ 4.08δ (quartet, $J_{HH}$7Hz, $J_{POCH}$8 Hz, 12.7 H, cal'd 12 H).
$^{31}P$ chemical shift (in substance) — 29.9 ppm.

The above mentioned ester is also obtained by heating $N(CH_2CH_2Cl)_3$ with $P(OC_2H_5)_3$ at 170° C for 25 hours. Yield 23.4 percent.

PREPARATION OF THE ACID 10 g of the end product obtained above and 35 ml of concentrated hydrochloric acid are refluxed for 40 hours using a condenser. Then, the mixture is evaporated to dryness at 80° C in high vacuum. There remains a residue. There is obtained a quantitative yield of a highly viscous oil which becomes glassy on drying, but does not crystallize. The acid still containing 3.4 mols of water of crystallization can be titrated as a pentabasic acid, showing peaks at pH 3.9 (two equivalents, found 201.1, calc'd 201) and at pH 9 (three equivalents, found 131.1 calc'd 134.0). According to the titration the acid is present as an inner ammonium salt

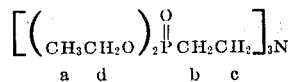

The $^1H$-NMR spectrum confirms the structure
a. $PCH_2$ 2.72δ (multiplet, 6.0 H, calc'd 6 H);
b. $NCH_2$ 3.95δ (multiplet, 7.4 H, calc'd 6 H); and
c. OH 5.73δ (singlet).

A sample of cotton textile fabric infused with the ammonium salt of nitrilotri(ethylenephosphonic acid) by soaking the fabric sample in a concentrated aqueous solution thereof for 30 minutes and drying the sample displays a slower burning rate than an untreated sample of the same fabric when both samples are ignited when held on a 45° inclined plane.

I claim:
1. Nitrilotri(ethylenephosphonic acid esters) of the general formula

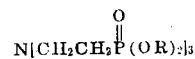

in which R signifies a hydrocarbon radical selected from the group consisting of aryl and alkyl, said radical containing up to eight carbon atoms.

2. Nitrilotri(ethylenephosphonic acid diethylester).

* * * * *